United States Patent
Rice et al.

(10) Patent No.: US 8,169,692 B2
(45) Date of Patent: May 1, 2012

(54) WAVEGUIDE PARAMETRIC DEVICE AND METHOD

(75) Inventors: Robert R. Rice, Simi Valley, CA (US); Elizabeth Twyford Kunkee, Manhattan Beach, CA (US); Peter Y. M. Livingston, Palos Verdes Estates, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 626 days.

(21) Appl. No.: 12/191,909

(22) Filed: Aug. 14, 2008

(65) Prior Publication Data

US 2010/0328760 A1 Dec. 30, 2010

(51) Int. Cl.
  *G02F 1/365* (2006.01)
  *G02F 1/39* (2006.01)
(52) U.S. Cl. .......................... 359/330; 359/332; 385/132
(58) Field of Classification Search .................. None
  See application file for complete search history.

(56) References Cited

U.S. PATENT DOCUMENTS

| | | | |
|---|---|---|---|
| 5,064,265 A | 11/1991 | Khanarian et al. | |
| 5,434,700 A | 7/1995 | Yoo | |
| 5,574,818 A * | 11/1996 | Krivoshlykov | 385/122 |
| 5,912,910 A | 6/1999 | Sanders et al. | |
| 6,304,585 B1 * | 10/2001 | Sanders et al. | 372/22 |
| 6,344,921 B1 * | 2/2002 | Galvanauskas et al. | 359/332 |
| 6,647,193 B2 | 11/2003 | Krastev et al. | |
| 6,771,409 B2 | 8/2004 | Huang | |
| 6,798,795 B2 * | 9/2004 | Yoo | 372/20 |
| 6,856,737 B1 | 2/2005 | Parker et al. | |
| 6,927,895 B2 | 8/2005 | Ju et al. | |
| 6,940,639 B1 | 9/2005 | Belyanin et al. | |
| 7,038,838 B2 | 5/2006 | Bayart et al. | |
| 2006/0245042 A1 | 11/2006 | Budni et al. | |
| 2007/0104443 A1 | 5/2007 | Helmy | |
| 2008/0170289 A1 * | 7/2008 | Rice et al. | 359/334 |

FOREIGN PATENT DOCUMENTS

EP  1 079 266 A1  2/2001
WO  WO 03/096116 A1  11/2003

* cited by examiner

*Primary Examiner* — Hemang Sanghavi
(74) *Attorney, Agent, or Firm* — John A. Miller; Miller IP Group, PLC

(57) ABSTRACT

A waveguide parametric device including a multi-mode waveguide having orientation layers formed in a propagation direction of a signal beam and a pump beam propagating down the waveguide. The orientation layers are oppositely oriented to provide non-linear coupling between the pump beam and the signal beam and have a periodicity that provides quasi-phase matching for a fundamental propagation mode, where the waveguide has a size to accommodate multi-mode wave propagation.

29 Claims, 1 Drawing Sheet

WAVEGUIDE PARAMETRIC DEVICE AND METHOD

BACKGROUND OF THE INVENTION

1. Field of the Invention

This invention relates generally to a waveguide parametric device that provides relatively high laser power in the wavelength range from the visible to the mid-wave infrared (MWIR) and, more particularly, to a multi-mode waveguide parametric device that generates an output beam at these wavelengths by providing quasi-phase matching between a signal beam and a pump beam, where the parametric device includes alternating oppositely orientated layers having a periodicity that provides the quasi-phase matching only for fundamental mode propagation.

2. Discussion of the Related Art

There is a significant need for a high power mid-wave infrared (MWIR) laser source for both military and industrial applications. For example, heat seeking missiles typically have a detector that detects mid-wave infrared wavelengths, particularly 3-6 µm, as a target. An MWIR laser source could provide an infrared counter measure by directing a beam from the source into the detector of the missile. Further, laser radar applications (LADAR) in the mid-wave infrared wavelengths are able to effectively penetrate moisture in the air, thus making them an all weather radar solution. Other applications for MWIR laser sources include atmospheric laser remote sensing and material processing. Additionally, a similar need exists for high power sources of visible and near infrared (NIR) wavelengths. For example, visible blue green wavelengths propagate well in ocean water, enabling detection of underwater mines or communicating with submerged submarines, and high power NIR beams are useful for LADAR and remote sensing.

It is known in the art to provide an MWIR laser source that generates a laser beam in the mid-wave infrared frequency range. However, there are significant design challenges for providing an MWIR laser source that generates mid-wave infrared wavelengths at high power. One approach for high power applications is to generate a laser beam that is not in the mid-wave infrared frequency range, and then use a non-linear conversion process, such as difference frequency generation (DFG), with appropriate phase matching to convert the laser beam to the mid-wave infrared frequencies. However, such a conventional solution is proven to be costly and relatively ineffective. Similarly, conventional high power sources for the visible or NIR employing second harmonic generation (SHG) or optical parametric amplification (OPA) are known to encounter serious performance limitations.

As is known in the art, single mode waveguides typically provide the best quality laser beam at a particular frequency band. As the size of the waveguide increases, however, more modes are typically generated, which reduces the brightness and quality of the beam. Technological advances in optical waveguide design and operation have allowed the size of the waveguide to increase and still provide for single mode beam propagation.

DETAILED DESCRIPTION OF THE EMBODIMENTS

The following discussion of the embodiments of the invention directed to a waveguide parametric device for providing a high power mid-wave infrared laser beam is merely exemplary in nature, and is in no way intended to limit the invention or its applications or uses.

Figure 1:
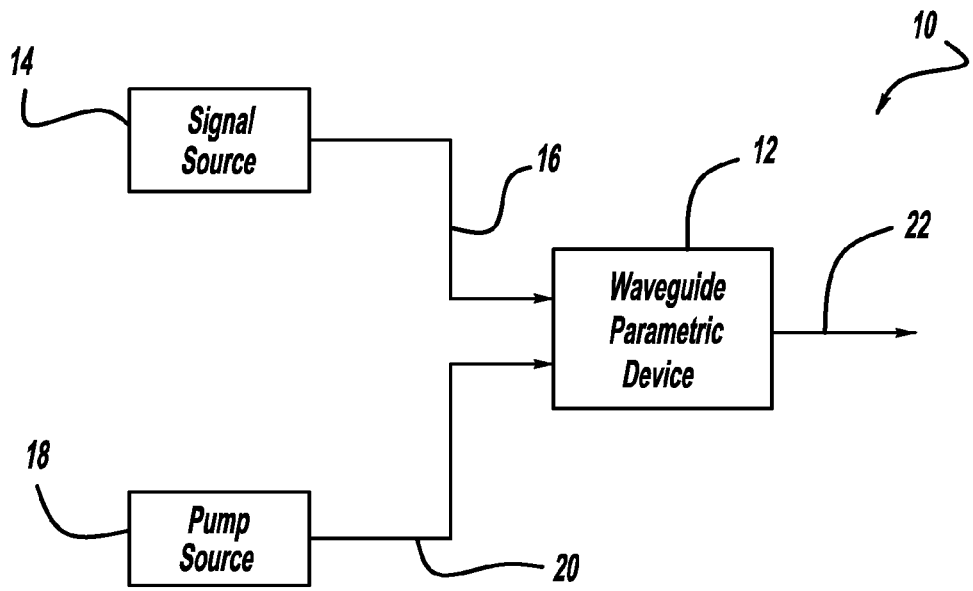
FIG. 1 is a block diagram of a laser system employing a waveguide parametric device for generating a high power mid-wave infrared laser beam, according to an embodiment of the present invention.

FIG. 1 is a block diagram of a laser system 10 including a waveguide parametric device 12. The system 10 also include an optical signal source 14 that generates a continuous wave or pulsed signal beam 16 and a continuous wave or pulsed pump source 18 that generates a pump beam 20. The parametric device 12 operates as an amplifying waveguide that allows the pump beam 20 and the signal beam 16 to propagate therethrough, where the frequency of the pump beam 20 is selected to amplify the signal beam 16 to the desired power level in an optical amplification process that is well understood to those skilled in the art. The signal beam 16 and an idler beam are output from the parametric device 12 as an output beam 22.

As will be discussed in detail below, a parametric conversion device, such as the waveguide parametric device 12, provides non-linear coupling between the signal beam, the pump beam and an idler beam to convert the pump beam to a beam at a desired output wavelength, for example, mid-wave infrared. In the parametric conversion process, a pump photon is annihilated and two photons, a signal photon and an idler photon, are simultaneously created. The idler beam is therefore always generated when the pump beam 20 is converted to the signal beam 16, as is well understood by those skilled in the art. The frequency of the signal beam 16 and the frequency of the idler beam must add up to the frequency of the pump beam based on the conversion of energy principal provided by the Manley-Rowe relationship. An additional constraint for efficient parametric conversion is that the photon momentum must also be conserved. That is, the phase-matching condition must be satisfied where the pump, signal and idler waves propagate with phase velocities such that extended synchronism occurs and energy can be exchanged.

Parametric conversion of pump power to signal and idler power can be accomplished in bulk non-linear crystals, provided the phase matching condition can be achieved by manipulation of dispersion and birefringence in a particular wave propagation direction, or through quasi-phase matching (QPM) in which periodic layers of oppositely oriented crystalline layers correct the effects of phase mismatch and enable efficient extended parametric interaction and wavelength conversion, as is well know by those versed in the art. The use of single mode waveguides for parametric conversion is also well known in which the optical power is confined to a thin waveguide region in order to increase the optical intensity. The nonlinear interaction, and hence conversion of power, is generally proportional to the square of the optical intensity in the non-linear optical medium, so that the length of the waveguide needed for efficient conversion can be shorter and the optical pumping power levels can be lower for efficient conversion because of the extended optical confinement possible as compared to a bulk crystal. The requirement to satisfy the phase matching condition remains nonetheless, and can be dealt with by techniques such as QPM.

There are, however, significant disadvantages that occur by the use of a single mode waveguide for parametric conversion. Perhaps the most serious is that the maximum operating power of the device may be limited by optical damage effects. Given the wavelength mode area and the optical intensity damage threshold for the non-linear crystal medium, the maximum operating power can be determined. Another problem relates to the practical difficulty of coupling a small beam into the waveguide. For example, a very thin waveguide, as is usually required to maintain single mode operation, implies a critical transverse alignment tolerance for the input beams that can be difficult to achieve and maintain for high power devices. Moreover, scattering losses due to the roughness of the interfaces can be relatively high for a single mode waveguide because such roughness overlaps the tails of the propagating mode to a significant degree in the thin waveguides and couples power into non-propagating radiation modes.

On the contrary, multi-mode waveguides are much less subject to scattering and mode conversion losses because of the relatively lower overlap of the interface roughness with the lowest order mode. This is a key feature of the present invention because it enables the launch of a clean lowest order mode with little tendency toward mode conversion or excessive scattering loss. This effect has been demonstrated by simulation results, wherein an exaggerated degree of roughness of the waveguide interfaces couples virtually no power to higher order modes and suffers only minimal scattering losses over a typical interaction length for a multimode non-linear waveguide. During the simulation, a fundamental order mode was injected into a waveguide whose length was 7 cm and whose sidewalls had a high degree of roughness (0.01 microns). A resulting intensity plot showed that little or no light was converted into higher order modes. A monitor plot showed the optical intensity of the fundamental mode as measured along the direction of propagation. After 7 cm, more than 95% of the energy remains in the fundamental mode and most of the energy that was lost is scattered into radiation modes as opposed to higher order guided modes, the presences of which would be evident in obvious oscillations along the length of the monitor plot. This calculation was done using the beam propagation method (BPM) for the fundamental mode at a wavelength of 1.5 µm, a waveguide refractive index of 3.5, and a cladding effective index of 3.4.

Figure 2:
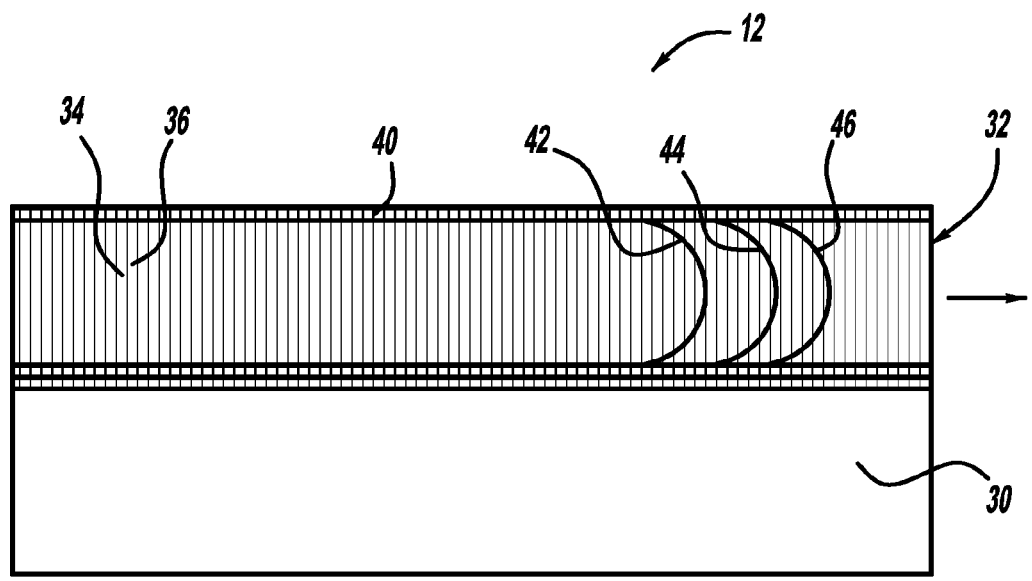
FIG. 2 is a cross-sectional view of the waveguide parametric device in the system shown in FIG. 1.

FIG. 2 is a cross-sectional view of the waveguide parametric device 12. The waveguide device 12 includes a heat sink substrate 30 that may be undoped GaAs in one non-limiting embodiment. A multi-mode waveguide 32 is fabricated on the substrate 30, and includes oppositely oriented orientation layers 34 and 36 formed in an alternating sequence for purposes that will be discussed in detail below. The size of the waveguide device 12 is chosen to be large enough to allow the propagation of multiple modes at the frequencies of the pump beam 20 and the signal beam 16. However, because the fundamental, lowest order, mode of the waveguide 32 is the only mode that is deliberately excited, the vast majority of the optical energy propagates and remains in that mode. The signal beam 16, the pump beam 20 and the idler beam are shown as sinusoidal beams 42, 44 and 46, respectively, propagating down the waveguide 32. The orientation layers 34 and 36 provide the quasi-phase matching between the signal beam 42 and the pump beam 44 that generates the mid-wave infrared beam.

The waveguide 32 is surrounded by cladding layers 40 having a lower index of refraction than the waveguide 32 so that an optical beam propagating down the waveguide 32 at a shallow enough angle of incidence will be confined therein. In one non-limiting embodiment, the waveguide 32 includes GaAs and the cladding layer 40 includes AlGaAs, where the addition of aluminum decreases the index of refraction of the cladding layer 40.

The power of the pump beam 20 and the size of the waveguide 32 determine the power of the output beam 22, where the power of the output beam 22 is limited by the power density that will damage the waveguide 32. Non-linear coupling between the pump beam 20 and the signal beam 16 produces the parametric optical gain that amplifies the low level signal beam 16 at the expense of the pump beam 20, thereby converting it to the output beam 22 at the desired wavelength. The non-linear coefficient for the waveguide material and the size of the waveguide 32 determines the amount of the non-linear coupling between the signal beam 16 and the pump beam 20 per unit propagation length, with thinner waveguide dimensions having higher non-linear coupling, but also lower optical damage thresholds.

In any parametric conversion device, the total non-linear conversion of pump power to signal power is also determined by the overall interaction length between the propagating beams. In a bulk crystal device, the pump beam is focused into the non-linear medium, where it forms a waist of a minimum diameter, converging to the waist from the input face and diverging from it to the output face. Because the pump and signal beam diameters vary along the propagation direction, so does the non-linear coupling per unit length. If the beams are more tightly focused to increase intensity and hence non-linear coupling in order to achieve higher overall conversion efficiency, the increased beam divergence can offset the intensity gain and limit the improvement at some point. On the other hand, the optical confinement in the waveguide 32 provides a constant coupling and enables the use of much longer interaction lengths.

In one embodiment, the cross-section of the waveguide 32 is square and the signal beam 16 and the pump beam 20 are directly butt coupled into the input face of the waveguide 32 from a large mode area optical fiber having the same fundamental mode beam diameter as the waveguide 32. The output beam 22 from the waveguide 32 can be directly butt coupled into a large mode area optical fiber having the same fundamental mode beam diameter as the waveguide 32.

Compared to a bulk crystal, the longer interaction length enabled by the waveguide 32 allows rejected heat to be spread over a larger area, and the shorter distance the heat must diffuse from the interior of the waveguide to the heat sink surfaces results in a much smaller interior temperature rise. This is important because limiting transverse and longitudinal temperature gradients in the waveguide 32 reduces thermally induced gradients in the indices of refraction of the waveguide material. Such thermally induced index gradients are known to have a very deleterious effect on the quasi-phase matching conditions between the signal beam 16 and the pump beam 20. Known QPM devices designed as bulk, free space devices have suffered thermal effects which limited efficiency and power. Thus, in order to provide an efficient non-linear conversion between the signal beam 16 and the pump beam 20, the length of the waveguide 32 provided by the interaction length should advantageously be relatively long.

Further, because the height of the waveguide 32 is relatively larger, such as 10-500 µm in one non-limiting embodiment, to provide multi-mode beam propagation, the position of an input fiber transmitting the pump and signal beams does not have to be exact relative to the waveguide 32 to within sub-micron tolerance as would be required for fundamental mode waveguides, which are typically on the order of 1 µm in thickness. Further, by having a waveguide in the 10-100 µm range, a good balance is achieved between transverse positional and angular orientation requirements of the input beams for efficient coupling into the multi-mode waveguide 32. Designs for which the fundamental mode diameters of large mode area fiber amplifiers closely match the mode dimensions of the fundamental mode for the multimode parametric waveguide device are both feasible and attractive.

The periodicity, i.e., thickness, of the orientation layers 34 and 36 is selected so that the layers 34 and 36 provide suitable quasi-phase matching for waves at the frequency of interest and the thickness of the waveguide 32. The orientation layers 34 and 36 are fabricated so that the lattice orientation of the crystals in one layer is directed upward and the lattice orientation of the crystals in the adjacent layer is directed downward in a predetermined pattern to provide the non-linear phase matching, where the orientation of the crystals of the layers 34 and 36 is perpendicular to the propagation direction of the beams. For any specific case having given frequencies satisfying the Manley-Rowe condition, the periodicity of the layers 34 and 36 is chosen to phase match the pump beam 42, the signal beam 44 and the idler beam 46, all of which propagate as fundamental modes of the multi-mode waveguide 32. It is noted that the periodicity required to phase match the fundamental waveguide mode at these three frequencies is different than it would be in a bulk crystal because of the effects of waveguide dispersion. As the beams propagate down the waveguide 32, the phase of the non-linear polarization created by the pump beam 42 creates the gain for the signal beam 44 and the idler beam 46, but typically the non-linear polarization and the signal/idler fields are synchronized only over a short distance (coherence length) so energy exchange between the pump and signal/idler waves does not occur efficiently. The phase reversals of the non-linear polarization provide by the alternating orientation of the layers 34 and 36 can maintain synchronism so that the fields can freely exchange energy over an extended interaction length.

The waveguide parametric device 12 typically has a relatively large mode radius to permit generating the desired power level, while still maintaining the lowest order waveguide modes necessary to generate the mid-wave infrared laser beam. In one embodiment, the waveguide 32 is rectangular in configuration and has a width of about 500 µm and a height of about 100 µm. For a large planer waveguide thickness, such as in this example, many modes can, in principal, propagate, but the lowest order or fundamental mode is single lobed in both dimensions at all wavelengths. The propagation constants for the lowest order modes at the pump frequency, the signal frequency and idler frequency can be easily obtained knowing the refractive index dispersion and the waveguide dimensions. Using orientation patterned growth techniques, a phase mismatch between these three waves can be accommodated by quasi-phase matching. For chi-2 processes (second order non-linearity), the non-linear mode coupling depends on the overlap integral of the modal fields, which involves the phases of the fields across the waveguide. Consequently, the non-linear mode coupling effectively vanishes for orthonormal sinusoidal modes of different order. Hence, efficient conversion can be obtained only from the lowest order pump mode at a given frequency to the lowest order signal and the idler modes for which QPM occurs. Hence, pump power is not lost to signal and idler modes of different (higher) order, which would degrade the beam quality of the output beam 22. The electric field in the waveguide 32 can be defined as:

$$\psi(z) = \sum_m \sum_n A_{mn}(z)\phi_{mn}(x, y)e^{i\beta_{mn}z}$$

$$\beta_{mn} = \left(\frac{2\pi n}{\lambda_0}\right)^2 - \left(\frac{m\pi}{a}\right)^2 - \left(\frac{n\pi}{b}\right)^2 \approx k_0 n - \left(\frac{\lambda_0 \pi}{4n}\right)\left[\left(\frac{m}{a}\right)^2 + \left(\frac{n}{b}\right)^2\right]$$

Where $A_{mn}$ is the mode amplitude coefficient and $\beta_{mn}$ is the mode propagation constant.

For a given pump wavelength and signal wavelength, the idler wavelength is determined by the Manley-Rowe condition. From the equations above, the respective β values for the three waves are determined for a given waveguide structure, i.e., using the values for the thickness a and b along with the refractive indices of the non-linear material for the three wavelengths (the material dispersion curve). The period of the orientation pattern must then be selected from the resulting δβ to achieve quasi-phase matching.

In one embodiment, the alternating orientation layers 34 and 36 are created by a non-linear crystal periodic poling process. As is well understood in the art, periodic poling of non-linear crystal materials is also a technique for obtaining quasi-phase matching of non-linear interactions. The periodic poling process generates a periodic reversal of domain orientation, referred to as domain inversion, in a non-linear crystal so that the sign of the non-linear coefficient changes. Suitable non-linear optical materials for periodic poling include, but are not limited to, potassium titanyl phosphate (KTP), lithium niobate (LN) and lithium tantalate (LT). Various techniques are known in the art for creating periodic poled structures, such as by using pulsed electric fields, electron bombardment, thermal pulsing, etc., to reposition the atoms in the crystal lattice creating oriented domains. The most common technique for periodic polling is ferro-electric domain engineering that involves the application of a strong electric field to a ferro-electric crystal by patterned electrodes on the crystal surface, which typically have a period between a few microns and tens of microns.

In an alternate embodiment, the orientation layers 34 and 36 are created by orientated crystal growth on a patterned substrate, such as orientation patterned GaAs layers, known to those skilled in the art. Orientation patterned GaAs layers (OP—GaAs) is provided by an epitaxial growth process for generating alternating layers of GaAs having oppositely oriented lattice structures. The epitaxial process includes depositing a patterned germanium Ge mono-layer on a GaAs wafer, and then initiating patterned GaAs growth to create the oppositely oriented layers. Similar growth of orientation pattern ZnSe are also demonstrated possibilities.

The monolithic multi-mode waveguide parametric device described above provides many advantages. These advantages include a waveguide sized for high non-linear coupling, but wherein the intensity is maintained below material damage limits. Further, the large and convenient mode size enables an easy lowest order pump mode launch. Also, the waveguide confinement assures long propagation lengths for efficient conversion. Further, the non-linear coupling only occurs to signal and idler modes having the same mode order so that the quality of the output beam generated is not degraded by thermal or other effects that can degrade the output beam in a bulk crystal device. Also, quasi-periodic patterned growth on the waveguide 32 provides quasi-phase matching for the pump beam, signal beam and idler beam wavelengths that are selected. Further, the waveguide 32 has excellent thermal properties compared to bulk crystals to enable high power. Also, the device is highly manufacturable, where the entire fabrication process is by epitaxial growth on pre-patterned GaAs substrates, is easily designed for a wide range of wavelengths and is very low cost.

Because the orientation layers 32 and 34, whether produced by epitaxial growth or ferro-electric poling, are defined by a photolithographic process, the waveguide parametric device 12 can be designed with a variable spacing for the orientation layers 34 and 36, which provide additional benefits as compared to bulk crystal devices. Particularly, the frequency band over which parametric conversion can be efficiently achieved can be broadened by chirping the period of the orientation layers so that a quasi-phase matched interaction region can be created for a range of optical frequencies. Chirped poling just described, enables this device to create second harmonic or difference frequency waves from femtosecond pulsed laser sources. For example, a 2.5 psec pulse at 1.55 microns will convert to its second harmonic with an efficiency of 0.5% if the poling chirp rate is about 0.035 nm/cm. On the other hand, no conversion occurs in a constant period poled medium (c.f., Canagasabey, Albert, et al, "Broadly tunable second-harmonic generation in periodically poled silica fibers," Optics Letters, Vol. 32, Num. 13, pp 1863-1865, 2008.). Another application would involve a series of QPM regions along the waveguide with different orientation layer spacings chosen so that the signal generated parametrically in a first QPM region would pump a similar process in a second QPM region to produce multiple predetermined wavelengths.

It will also be recognized by those skilled in the art that in such a waveguide, for an appropriate quasi-phase matching periodicity, the idler and signal beams can be at the same frequency in which the down-conversion process is said to be degenerate and the frequency of the output beam 22 is precisely one half the pump frequency. Similarly, two pumping photons can be non-linearly combined to produce one output photon, in which case the frequency of the pump is said to be frequently doubled where the output beam 22 has a frequency twice the frequency of the pump beam 20. Both processes have significant device value.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. An optical system comprising:
an optical source providing a continuous wave or pulsed signal beam;
a pump source providing a continuous wave or pulsed pump beam; and
a parametric device including a multi-mode waveguide having a size that allows propagation of multiple optical modes, said waveguide receiving the signal beam and the pump beam where the signal beam and the pump beam are introduced into the waveguide at only a lowest order fundamental propagation mode of the waveguide so that only the fundamental mode is excited in the waveguide, said waveguide including non-linear orientation layers that alternate in a predetermined pattern in a propagation direction of the signal beam and the pump beam, said orientation layers having oppositely orientated crystal lattices that provide non-linear coupling, wherein the waveguide has a width of about 500 μm and a height in the range of 10-100 μm to provide a high power output beam.

2. The optical system according to claim 1 wherein the orientation layers provide non-linear coupling only between waveguide modes of similar order as a result of orthonormality, said modes including modes at the pump beam and signal beam frequencies and an idler beam frequency, said waveguide having such a size as to accommodate substantial multi-mode propagation at the frequencies of the pump beam, signal beam and idler beam.

3. The optical system according to claim 1 wherein the orientation layers have a periodicity that provides quasi-phase matching for the fundamental propagation mode at a specific predetermined pump frequency, the fundamental propagation mode at a second predetermined signal frequency and the fundamental propagation mode at a corresponding idler frequency.

4. The optical system according to claim 1 wherein the non-linear orientation layers are formed as orientation patterned layers formed by an epitaxial growth process on a patterned semiconductor substrate.

5. The optical system according to claim 4 wherein a thin optical confining layer of a lower refractive index is grown epitaxially on the patterned substrates between the substrate and the non-linear orientation layers and upon the upper surface of the non-linear orientation layers.

6. The optical system according to claim 4 wherein the orientation pattern layers are oriented GaAs layers grown on a patterned GaAs substrate and optical confining layers are AlGaAs having a lower refractive index.

7. The optical system according to claim 1 wherein the orientation layers are formed as periodically poled non-linear crystal layers.

8. The optical system according to claim 7 wherein the orientation layers are made of a material selected from a group consisting of lithium niobate, lithium tantalate and potassium titanyl phosphate.

9. The optical system according to claim 1 wherein the parametric device includes a heat sink having high thermal conductivity directly mounted to one or more surfaces of the waveguide.

10. The optical system according to claim 9 wherein the heat sink includes an undoped GaAs substrate layer.

11. The optical system according to claim 1 wherein the output beam from the multi-mode waveguide is in the mid-wave infrared frequency range.

12. The optical system according to claim 1 wherein the output beam from the multi-mode waveguide includes a single optical frequency at one-half the frequency of the pump beam.

13. The optical system according to claim 1 wherein the output beam from the multi-mode waveguide includes a single optical frequency at twice the frequency of the pump beam.

14. The waveguide parametric device according to claim 1 wherein the output beam from the waveguide is directly butt coupled into a large mode area optical fiber having the same fundamental mode beam diameter as the waveguide.

15. The optical system according to claim 1 wherein the orientation layers are produced by photolithographic processes having multi or chirped spacing patterns in the same multi-mode waveguide with a chirp designed to match the pump and signal bandwidth.

16. The optical system according to claim 15 wherein the orientation layers produce output beams including multiple predetermined wavelengths.

17. The optical system according to claim 15 wherein the orientation layers extend the signal frequency range over quasi-phase matching in an efficient manner.

18. A waveguide parametric device comprising:
a multi-mode waveguide having a size that allows propagation of multiple optical modes, said waveguide including orientation layers formed in a propagation direction of a beam propagating through the waveguide, said orientation layers being an alternating sequence of layers where crystals in adjacent layers are oriented in an opposite direction to provide quasi-phase matching between a signal beam and a pump beam, wherein the signal beam and the pump beam are introduced into the waveguide at only a lowest order fundamental propagation mode of the waveguide so that only the fundamental mode is excited in the waveguide, wherein the waveguide has a width up to about 500 μm and a height in the range of 10-100 μm to allow a high power output beam; and
a heat sink substrate mounted to the waveguide.

19. The waveguide parametric device according to claim 18 wherein the orientation layers are formed as orientation patterned layers.

20. The waveguide parametric device according to claim 19 wherein the orientation patterned layers are GaAs layers.

21. The waveguide parametric device according to claim 18 wherein the orientation layers are formed as periodically poled crystal layers.

22. The waveguide parametric device according to claim 21 wherein the orientation layers are made of a material selected from a group consisting of lithium niobate, lithium tantalate and potassium titanyl phosphate.

23. The waveguide parametric device according to claim 18 wherein the output beam from the multi-mode waveguide is in the mid-wave infrared frequency range.

24. A waveguide parametric device for generating a mid-wave infrared beam, said device comprising:
a rectangular multi-mode waveguide having a size that allows propagation of multiple optical modes, said waveguide including orientation layers formed in a propagation direction of a beam propagating through the waveguide, said orientation layers having oppositely orientated crystal lattices that provide non-linear coupling between a pump beam and a signal beam and have a periodicity that provides quasi-phase matching for a fundamental propagation mode, said waveguide having a size to accommodate multi-mode wave propagation at the frequencies of the signal beam and the pump beam, wherein the signal beam and the pump beam are introduced into the waveguide at only a lowest order fundamental mode of the waveguide so that only the fundamental mode is excited in the waveguide, wherein the waveguide has a width up to about 500 μm and a height in the range of 10-100 μm to provide a high power output beam; and
a heat sink substrate mounted to the waveguide.

25. The waveguide parametric device according to claim 24 wherein the orientation layers are formed as orientation patterned layers.

26. The waveguide parametric device according to claim 24 wherein the orientation layers are formed as periodically poled crystal layers.

27. The optical system according to claim 1 wherein the pump beam is converted into the signal beam in the waveguide which generates an idler beam at an idler beam frequency that is different than a signal beam frequency, and wherein the output beam from the waveguide includes both the signal beam at the signal beam frequency and the idle beam at the idler beam frequency.

28. The optical system according to claim 18 wherein the pump beam is converted into the signal beam in the waveguide which generates an idler beam at an idler beam frequency that is different than a signal beam frequency, and wherein the output beam from the waveguide includes both the signal beam at the signal beam frequency and the idle beam at the idler beam frequency.

29. The optical system according to claim 24 wherein the pump beam is converted into the signal beam in the waveguide which generates an idler beam at an idler beam frequency that is different than a signal beam frequency, and wherein the output beam from the waveguide includes both the signal beam at the signal beam frequency and the idle beam at the idler beam frequency.

* * * * *